May 21, 1963   J. W. BROOME   3,090,400
PRESSURE BALANCED DOUBLE PORTING SERVO VALVE
Filed May 16, 1960   3 Sheets-Sheet 1

INVENTOR
JOSEPH W. BROOME
T. Lloyd La Fave
ATTORNEY

May 21, 1963 J. W. BROOME 3,090,400
PRESSURE BALANCED DOUBLE PORTING SERVO VALVE
Filed May 16, 1960 3 Sheets-Sheet 2

INVENTOR
JOSEPH W. BROOME
T. Lloyd LaFave
ATTORNEY

INVENTOR
*JOSEPH W. BROOME*
T. Lloyd La Fave
ATTORNEY

United States Patent Office 3,090,400
Patented May 21, 1963

3,090,400
PRESSURE BALANCED DOUBLE PORTING
SERVO VALVE
Joseph W. Broome, South Sudbury, Mass., assignor to The
Oilgear Company, Milwaukee, Wis.
Filed May 16, 1960, Ser. No. 29,238
2 Claims. (Cl. 137—622)

This invention relates to an improved valve construction for a valve of the flat faced type and more particularly to a pressure balanced flat faced servo valve.

The present valve is of the four way type illustrated in applicant's U.S. Patent 2,939,483. The improvement herein consists of providing pressure balance for a moveable valve plate together with means for doubling the flow capacity of the valve. The construction is such that the inertia of the moving element of the valve is not materially increased over that for a moving element having flow only along one face and providing one-half of the present flow capacity. The present valve is capable of controlling large hydraulic power in response to a minimum input signal and is capable of fast response to the input signal, as described in U.S. Patent 2,939,483.

It is an object of this invention to provide an improved valve having a minimum of friction between moving and stationary parts. Another object of the invention is to provide a valve of the flat faced type having a moveable valve element that is balanced by operating pressure applied to both faces of the valve. Another object of the invention is to provide a flat faced valve having a moveable valve element that is symmetrically constructed on opposite valve faces along which a controlled parallel flow of the pressure fluid is provided. Another object of the invention is to provide an improved method of making and assembling the valve so that the surfaces defining the critical dimensions of the valve are more easily and accurately obtained.

Other objects and advantages may be apparent upon a reading of the following description taken with the accompanying drawings, in which.

Figure 1:
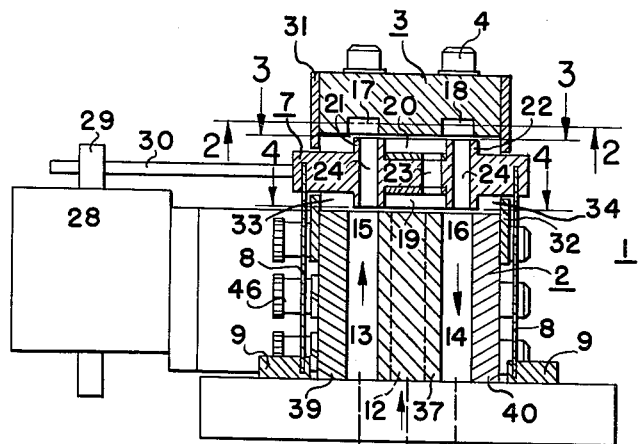
FIG. 1 is a view in elevation of a servo valve embodying the present invention and shows the valve connected to an operating motor and shows flow passages of the valve schematically connected in a servo controlled hydraulic system; the valve proper is shown in cross section taken along the line 1—1 of FIG. 4.
Figure 5:
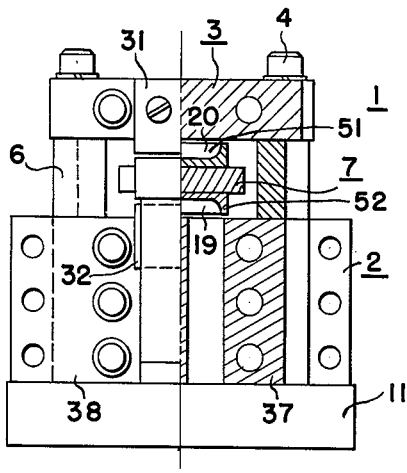
FIG. 5 is a view taken along line 5—5 of FIG. 3.

Referring to the drawing and particularly to FIG. 1, a four way flat faced valve 1 embodying the present invention and as shown generally in FIG. 1 comprises a valve block 2, a valve head 3 rigidly secured by bolts 4 to the valve block and spaced therefrom by spacer blocks 6, FIG. 5 through which the bolts extend, and a valve plate 7 disposed between the valve head and valve block and adapted for rectilinear movement therebetween.

The valve plate 7 is supported by a pair of leaf type springs 8 which are longitudinally rigid and laterally resilient and hold the valve plate 7 in spaced relation between the valve head 3 and valve block 2 and normally hold the valve plate in a center or null position in which position the valve is essentially closed. The springs 8 have their upper ends integrally joined to opposite ends of the valve plate 7 and their lower ends integrally joined to mounting feet 9 that are bolted to a base 11 for the valve block 2.

The valve block 2 is provided with a supply passage 12 located centrally of the valve block between a pair of control passages 13, 14 which at their openings in the valve face of the valve block define control chambers 15, 16. The face of the valve head has recesses formed therein defining control chambers 17, 18 aligned respectively with the control chambers 15, 16 in the valve block.

The valve plate 7 has opposite faces symmetrically constructed which include a pair of spaced lands 21, 22 which normally align with the control chambers 15 to 18 in the valve head and valve block. The edges of the lands and of the control chambers cooperate to provide flow control orifices which govern the rate of flow of fluid to and from the control chambers along the faces of the valve members.

The lands 21, 22 of the valve plate define pressure chambers 19, 20 therebetween, and these pressure chambers 19, 20 on opposite sides of the valve plate are interconnected by one or more transverse passages or holes 23 through the section of the valve plate between the lands.

The land portions of the valve plate also have transverse passages or holes 24 therethrough which interconnect aligned control chambers 15 and 17 and aligned control chambers 16 and 18 in the valve head and valve block. Thus, the pressure of fluid in the pressure chambers 19 is always equal on opposite sides of the valve plate, and the pressures of fluid in the control chambers 15 to 18 are always equal on opposite faces of the lands, whereby the valve plate is always pressure balanced.

The supply passages 12 and the control passages 13, 14 in the valve block have openings in the bottom of the block which are adapted for connection in an external hydraulic circuit. The valve block may be provided with fluid return passages which connect to return chambers 33, 34, or as indicated in FIG. 1, such return is provided by way of a reservoir 25 formed by a housing, not shown, into which fluid from the return chambers 33, 34 is discharged.

The valve is shown schematically connected to regulate the flow of fluid from a pump 26 in either direction to a hydraulic motor 27. The pump 26 has an output that is connected to the supply passage 12 of the valve block 2 and the pump suction is connected to a reservoir 25. The load hydraulic motor 27 is connected hydraulically across the control passages 13, 14.

A servomotor for controlling movement and displacement of the valve plate 7 from its null position if provided by a torque motor 28 having a moveable member 29 which transmits its motion through a rod 30 to move the valve plate 7 rectilinearly between the valve head 3 and valve block 2. Thus, the displacement and direction of displacement of the valve plate 7 is controlled in accordance with the command of the torque motor 28.

In FIG. 1, the torque motor 28 holds the valve plate 7 displaced slightly to the right of its null position whereby flow of fluid is to the right from the pressure chambers 19 along opposite faces of the valve plate to the right control chambers 16, 18 and then through the right control passage 14 to the right end of the hydraulic motor 27. Fluid is discharged at the left end of the hydraulic motor 27 and flows into the left control passage 13 and then into left control chambers 15, 17. From the left control chambers the fluid flows to the left along opposite faces of the left lands 21 into return or discharge chamber 33 along the outer section of the valve plate from which fluid may spill out over the valve for collection in the reservoir 25 and return to the pump 26.

If the valve plate 7 were displaced to the left of its null position, the fluid would flow from the pressure chambers 19, 20 to the left control chamber 15, 17 and to the left end of the hydraulic motor 27. Fluid discharged from the right end of the hydraulic motor would enter right control chambers 16, 18 and discharge into chamber 34 for return to the pump.

The return or discharge area of the valve plate at opposite ends thereof is closed in the direction of movement of the valve plate by baffle plates 31, 32 secured to the outer sides of the valve head and valve block. These baffle plates extend the width of the valve plate and thus cause fluid discharging from the valve to spill out transversely of the direction of valve plate movement. The baffle plates 31, 32 being secured to the stationary valve head 2 and valve block 3 partially enclose return chambers 33, 34 outwardly of the lands so that the fluid reacts on the adjacent land 21 or 22 and produces an effective force tending to hold the valve open.

Thus the valve controls the flow of fluid therethrough and provides pressure balance for the valve plate and flow along opposite faces of the valve plate to double the flow capacity of the valve for each valve displacement.

Figure 4:
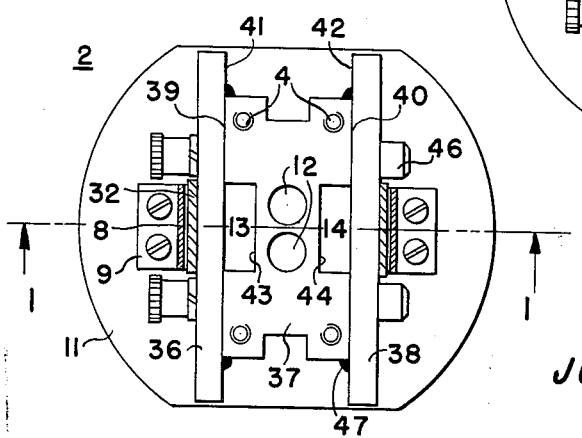
FIG. 4 is a view taken along the line 4—4 of FIG. 1 looking down on the face of the valve block.

Valve block 2 as can readily be seen from FIGS. 1 and 4 is made up of three sections which include a central section 37 confined between two outer sections 36 and 38. The central section 37 is a single block having a width equal to the spacing between the outer vertical surfaces of the lands 21, 22 so that outer vertical surfaces 39, 40 of the central section are normally in the plane of the outer vertical surfaces of the lands. Outer section 36 has a vertical surface 41 which abuts vertical surface 39 of the central section and its edge cooperates with the outer edge of land 21 to meter flow from control chamber 15 to return chamber 33. Outer section 38 has a vertical surface 42 which abuts vertical surface 40 of the central section and its edge cooperates with the outer edge of land 22 to meter flow from control chamber 16 to return chamber 34.

Supply passage 12 in the central section 37 is provided by a pair of vertically drilled holes, and control passages 13, 14 are provided by vertical slots formed in the outer vertical surfaces 39, 40 of the center section which abuts the surfaces 41, 42 of the outer sections 36, 38. The depth of the slots forming the control passages 13 and 14 are such that their vertical bottom surfaces 43, 44 are spaced apart equal to the spacing between the adjacent or inner vertical surfaces of the lands 21, 22 at least at the upper control chamber defining portions of the control passages. The slots defining the control chambers are therefore made to a depth equal to the width of each land 21, 22. The central section thus formed includes the four critical surfaces which must lie in the planes of the four parallel vertical surfaces of the lands, when the valve plate is at null position. Forming the control chambers by providing slots in the outer vertical surfaces of the central section thus provides using a single lamina to make the central section with the four critical surfaces which must be accurately faced and spaced relative to one another.

The sections 36, 37 and 38 are secured together by bolts 46 which extend horizontally through the sections to clamp them together and welds 47 at the juncture of vertical end surfaces of the central section and outer sections secure the sections so their valve faces remain coplanar.

Figure 2:
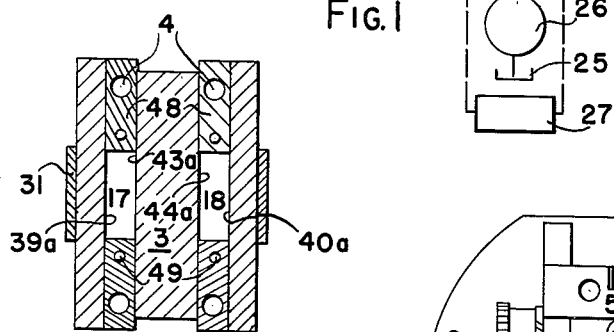
FIG. 2 is a view of the valve head of FIG. 1 taken along the line 2—2 thereof.

The valve head 3 is constructed to present a valve face with control chambers therein having vertical surfaces in alignment with the critical vertical surfaces of the valve block so that their metering edges are correspondingly accurately spaced. To best accomplish this arrangement, the valve head 3 is formed, FIGS. 1 and 2, of a single block and slots are machined across its valve face to present vertical surfaces 39a, 43a in the slot defining control chamber 17 and vertical surfaces 40a, 44a in the other slot defining control chamber 18; these vertical surfaces align with corerspondingly numbered vertical surfaces (without the subscripts) of the central section of the valve block. Opposite ends of these slots in the valve head are closed by insert plates 48 fitted therein and suitably secured by pins 49 which may be welded to the block and insert plates.

Figure 3:
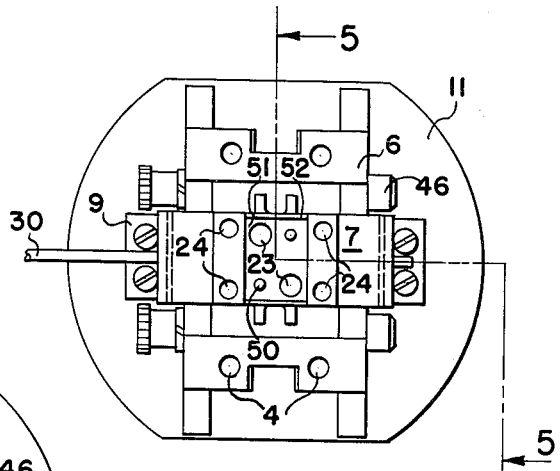
FIG. 3 is a view taken along the line 3—3 of FIG. 1 and shows the moveable valve member on the valve block.

The valve plate 7 has opposite faces symmetrically formed and may be made from a piece of stock with the pressure chambers 19 and 20 formed between the lands by a slot machined across the plate. The adjacent vertical surfaces of the lands which have metering edges may readily be machined and accurately faced. The slot between the lands is closed at opposite ends by U-shaped members 51 whose legs 52 form the closing walls for the slots. The U-shaped members are secured to the valve plate by rivets 50, FIG. 3.

Figure 6:
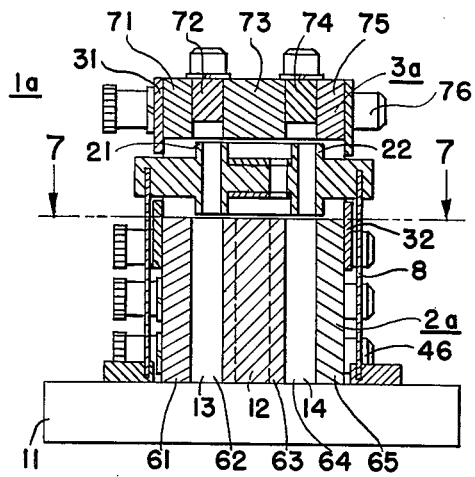
FIG. 6 is another valve similar to that shown in FIG. 1, and is a view in cross sectional elevation taken along line 6—6 of FIG. 7.

The valve 1a shown in FIG. 6 differs from that shown in FIG. 1 in that the valve head 3a and valve block 2a each comprise five sections or laminations. The metering edges of the control chambers in the valve head and valve block are provided by vertical surfaces of different sections, wherein the number of sections is one more than the number of metering edges. Valve block 2a comprises sections 61 through 65. Center section 63 contains vertical holes providing supply passage 12. The width of the center section is equal to the spacing between the adjacent metering edges of the lands 21, 22 so that the vertical surfaces of the center section provide the metering edges of the valve block which cooperate with the adjacent edges of the lands.

Figure 7:
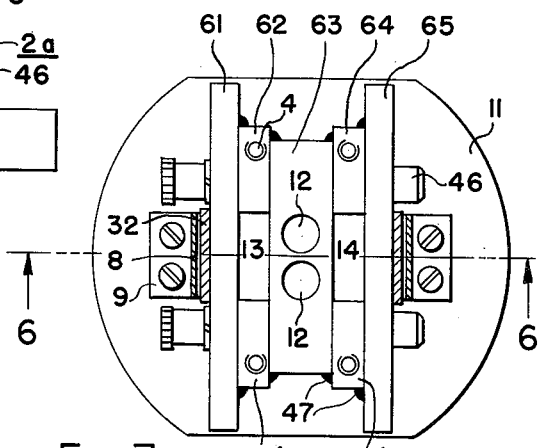
FIG. 7 is a view taken along the line 7—7 of FIG. 6 to better show the sections of the valve.

Outer sections 61 and 65 of the valve block are spaced from the center section 63, as seen in FIG. 7, by spacer sections 62, 62' and 64, 64', respectively. One spacer section is made up of spacers 62 and 62' which are spaced front and back from each other to provide control passage 13 therebetween whose upper end defines a control chamber 15. The other spacer section is made of spacers 64, 64' which are spaced front and back from each other to provide control passage 14 therebetween whose upper end defines a control chamber 16. The spacer sections are made to a width equal to the width of each of the lands 21, 22. The sections are clamped rigidly together by bolts 46 and are further secured to maintain their valve faces coplanar by welds along the vertical joints at the ends of the sections.

The valve head 3a comprises sections 71 through 75 clamped rigidly together by a through bolt 76 and further secured to maintain their valve faces coplanar by suitable welds 47 along the joints of adjacent sections. Each of these sections 71 to 75 corerspond in width to the sections 61 to 65 of the valve block. Center section 73 is made equal to the spacing between control chambers 17 and 18 and the spacing between adjacent vertical surfaces of the lands 21, 22, so that their adjacent metering edges cooperate to provide flow control orifices. Outer sections 71 and 75 are spaced from the center section 73 by spacer sections 72 and 74 each being slotted to provide the control chambers 17, 18.

Figure 9:
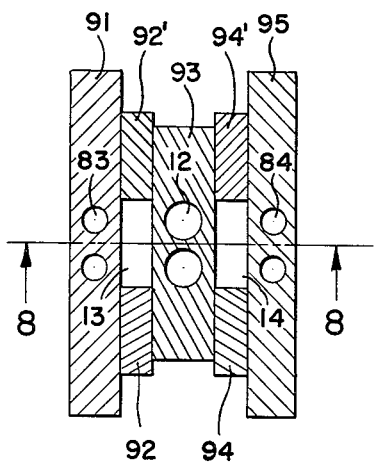
FIG. 9 is a view taken along the line 9—9 of FIG. 8 to show the sections of the valve.
Figure 8:
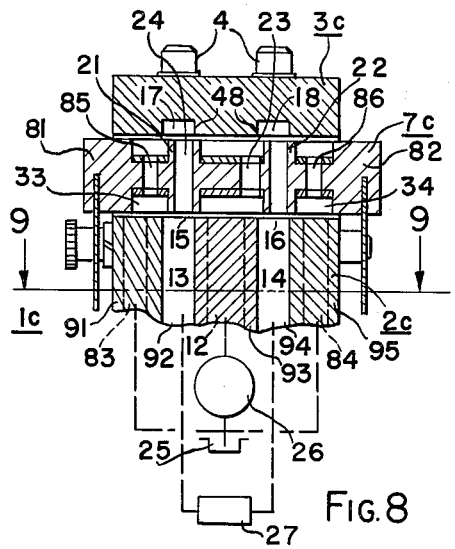
FIG. 8 is a view in elevation taken along the line 8—8 of FIG. 9 of another valve embodying the present invention and includes return passages in the valve block.

FIGS. 8 and 9 show a four way valve 1c that is pressure balanced and provides for parallel fluid flow along both sides of its valve plate 7c. The valve plate 7c has seal lands 81, 82 at opposite ends to close the return chambers 33, 34 formed at opposite ends between the land 21 and seal land 81 and between the land 22 and seal land 82. The valve block 2c includes drilled holes providing return passages 83, 84 through the valve block and which are adapted for connection to an inlet port of pump 26. The valve plate 2c, because of the seal lands employed, has drilled holes 85, 86 through the web portions adjacent the seal lands to interconnect return chambers on opposite sides of the valve plate. The valve block is made up of sections 91 through 95 in the manner described for the valve block 2b shown in FIG. 6. The valve head 3c is made of a single block with transverse slots having spaced inserts 48 therein as described and shown for the valve head 3 of FIG. 2.

Figure 10:
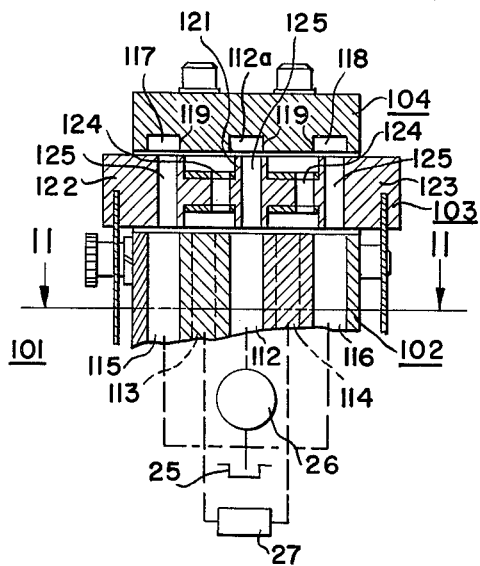
FIG. 10 is a view in elevation taken along the line 10—10 of FIG. 11 showing another valve embodying the present invention and in which the pressure supply passage is normally closed by a land on the valve plate.
Figure 11:
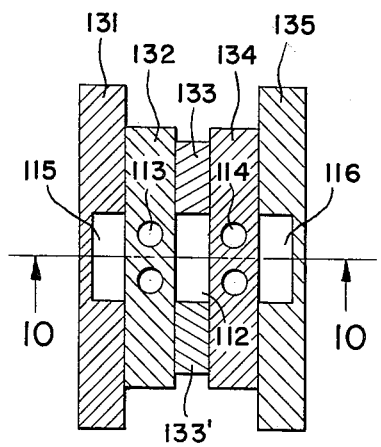
FIG. 11 is a view taken along the line 11—11 of FIG. 10 to better show the sections of the valve.

FIGS. 10 and 11 show a four way flat faced valve 101 having a pressure supply passage 112 and pressure chamber 112a normally closed by central lands 121 on opposite faces of a valve plate 103 and seal lands 122, 123 that normally close return passages 115, 116 in the valve head 104 and valve block 102. The valve plate 103 has transverse flow passages 125 provided by drilled holes through the lands and also through the intermediate portions of the valve plate. The valve head is provided with a pressure chamber 112a in alignment with supply passage 112 and is also provided with return chambers 117, 118 in alignment with return passages 115, 116 respectively, in the valve block.

The valve head 104 is made of a single block that is slotted across to establish the return chambers 117, 118 and the pressure chamber 112a. The end portions of each of such slots are closed by spaced inserts 119 suitably secured therein as are the inserts 48 in valve head 4.

The valve block 102 is made up of five sections 131 to 135 whose adjoining vertical surfaces align with the critical metering edges of the lands and valve head. The central section 113 is made up of two parts 133 and 133' spaced apart front to back to provide the pressure supply passage 112. The central section 133 has a width equal to that of the central land 121 which normally blocks it. Abutting the central section are adjacent sections 132 and 134 each of which has a width equal to the spacing between the central land 121 and a seal land 122, 123. Control passages 113, 114 are formed by vertically drilled holes through these adjacent sections. The vertical surfaces of the adjacent lands provide the metering edges for the valve block. The outer sections each have vertical slots abutting the adjacent sections and these vertical slots provided the return passages 115, 116. The sections aer all secured by through bolts and are also welded along outer vertical joints for securing their valve faces in coplanar relationship.

Various embodiments of the invention have been shown and described and it will be obvious that changes may be made therein within the spirit of the invention and the scope of the appended claims.

I claim:

1. A flat valve construction comprising a valve block having a first flat valve face, a valve head rigidly secured in spaced relation to said valve block and presenting a second flat valve face, rectangularly shaped control chambers formed in said first flat valve face and corresponding control chambers formed in said second flat valve face in alignment with said control chambers in said first flat valve face, a valve plate having opposite symmetrically arranged third and fourth flat valve faces each formed by a pair of rectangular shaped lands aligned with said control chambers when the valve is in a null position, a pair of leaf springs secured to opposite ends of said valve plate and to opposite sides of said valve block to support said valve plate between said valve block and said valve head in closely spaced friction free relation to said first and second flat valve faces thereof and to permit rectilinear movement of said valve plate in opposite directions along a line through said lands for controlling fluid flow through said valve, passage means through said valve plate interconnecting opposite face portions thereof; said valve block comprising an assembly of parallel sections normal to said valve plate, bolt means parallel with said valve faces securing said sections together so that their ends defining portions of said first valve face are coplanar, means integrally joining adjacent said sections together along abutting side edges thereof; said sections including a pair of end sections, a pair of control sections each adjacent one of said end sections, and a central section between said control sections; said central section having a passage extending therethrough for supplying pressure fluid to pressure chambers formed between said lands in said valve plate and said central section also having a width gauged to the spacing between said lands so that opposite face of said central section provide sharply defined square edges in the first valve face; said control sections each comprising a pair of spacer members spaced apart in the plane of its own section and having a width equal to the width of one of said lands to space the end sections from the central section so that flat vertical surfaces of said end sections and center section define walls of said control chamber and also provide sharply defined edges in the first valve face which cooperate with the edges of the lands to define flow control orifices.

2. A flat valve construction comprising a valve block having a first flat valve face, a valve head rigidly secured in spaced relation to said valve block and presenting a second flat valve face, rectangularly shaped control chambers formed in said first flat valve face and corresponding control chambers formed in said second flat valve face in alignment with said control chambers in said first flat valve face, a valve plate having opposite symmetrically arranged third and fourth flat valve faces each formed by a pair of rectangular shaped lands aligned with said control chambers when the valve is in a null position, a pair of leaf springs secured to opposite ends of said valve plate and to opposite sides of said valve block to support said valve plate between said valve block and said valve head in closely spaced friction free relation to said first and second flat valve faces thereof and to permit rectilinear movement of said valve plate in opposite directions along a line through said lands for controlling fluid flow through said valve, passage means through said valve plate interconnecting opposite face portions thereof; said valve block comprising an assembly of vertical sections normal to said valve plate, said sections including two end sections and a central section sandwiched between said end sections; said central section having a vertical hole extending therethrough defining a passage for supplying pressure fluid to the pressure chambers formed between said lands in said valve plate, aligned vertical slots extending through opposite vertical faces of the central section each having a depth gauged to the width of each of said lands, said end sections overlying said slots to define the control chambers in said valve block so that the vertical surfaces thereof and of the bottom of the slots provide sharply defined edges in the valve face of the valve block which cooperate with the edges of the lands to provide four flow control orifices of the valve, bolt means extending through said sections parallel with said valve plate to secure said sections with their valve face portions coplanar, and weld means integrally joining said central section to said end sections along outer abutting edges thereof for maintaining the valve face portions coplanar; said valve plate lands extending across said valve plate and having U-shaped inserts disposed between the lands on opposite sides of the valve plate so that the legs of the inserts provide end walls for the pressure chambers formed thereby; and the valve head effecting a laminated assembly comprising a main valve head member having transverse slots there across gauged to the width of the lands for alignment therewith and having the portions of such slots extending beyond the lands closed by insert plates fitted and secured therein.

References Cited in the file of this patent
UNITED STATES PATENTS

| | | |
|---|---|---|
| 2,105,473 | Dean | Jan. 18, 1938 |
| 2,875,782 | Shih-Ying Lee | Mar. 3, 1959 |